US008862755B2

(12) United States Patent
Gurdan et al.

(10) Patent No.: US 8,862,755 B2
(45) Date of Patent: Oct. 14, 2014

(54) APPARATUS AND A METHOD FOR MODIFYING A COMMAND MESSAGE IN A DIGITAL MULTIMEDIA NETWORK

(75) Inventors: Robby Gurdan, Graefenberg (DE); Richard Foss, Grahamstown (ZA)

(73) Assignee: U-Man Universal Media Access Networks GmbH, Grahamstown (ZA)

( * ) Notice: Subject to any disclaimer, the term of this patent is extended or adjusted under 35 U.S.C. 154(b) by 989 days.

(21) Appl. No.: 12/681,242

(22) PCT Filed: Oct. 2, 2008

(86) PCT No.: PCT/EP2008/063197
§ 371 (c)(1),
(2), (4) Date: Jul. 29, 2010

(87) PCT Pub. No.: WO2009/043897
PCT Pub. Date: Apr. 9, 2009

(65) Prior Publication Data
US 2010/0299424 A1  Nov. 25, 2010

(30) Foreign Application Priority Data

Oct. 4, 2007  (EP) .................... 07117923
Oct. 5, 2007  (EP) .................... 07117998

(51) Int. Cl.
*G06F 15/173* (2006.01)
*G06F 15/16* (2006.01)

(52) U.S. Cl.
USPC ............ 709/230; 709/223; 709/231; 709/246

(58) Field of Classification Search
USPC ....................................................... 709/223
See application file for complete search history.

(56) References Cited

U.S. PATENT DOCUMENTS

| | | | |
|---|---|---|---|
| 7,228,334 B1 * | 6/2007 | Jordan, Jr. ..................... | 709/206 |
| 2003/0208563 A1 * | 11/2003 | Acree et al. ................... | 709/219 |
| 2003/0217136 A1 | 11/2003 | Cho et al. ....................... | 709/223 |
| 2004/0225491 A1 * | 11/2004 | Chang .............................. | 704/2 |
| 2005/0239396 A1 * | 10/2005 | Kreifeldt et al. ............. | 455/3.01 |
| 2008/0146217 A1 * | 6/2008 | Bonnett ......................... | 455/424 |

FOREIGN PATENT DOCUMENTS

WO   WO 2004/088956   10/2004

OTHER PUBLICATIONS

Igumbor, Osedum, P, "A proxy approach to protocol interoperability within digital audio networks", Sep. 2009, Masters thesis, Rhodes University, p. 1-204.*
Claudio Gennaro, Matteo Mordacchini, Salvatore Orlando, and Fausto Rabitti. 2008. Processing complex similarity queries in peer-to-peer networks. In Proceedings of the 2008 ACM symposium on Applied computing (SAC '08). ACM, New York, NY, USA, 473-478.*
J. Dibley and R. J. Foss, "An investigation into the AES X170 project for control of Ethernet AVB networks," in SATNAC 2012 Proceedings, S. Scriba, Ed., No. 978-0-620-53713-1. Telkom SA, 2012, pp. 141-146.*

(Continued)

*Primary Examiner* — Taylor Elfervig
(74) *Attorney, Agent, or Firm* — Westman, Champlin & Koehler, P.A.

(57) ABSTRACT

An apparatus for modifying a command message (CMD) received from a source apparatus to control a target device parameter of a target apparatus within a digital multimedia network, wherein a hierarchical parameter address (HPA) or a parameter value contained in said command message (CMD) is changed according to at least one change script to provide a modified command message (CMD').

14 Claims, 10 Drawing Sheets

(56) References Cited

OTHER PUBLICATIONS

Igumbor et al., "A proxy solution for networked audio device interoperability", Jul. 2009, Department of Computer Science—Rhodes University, p. 1-6.*

"XFN-Cross Fire Network—Wikipedia"—XP-002533830 XFN-Cross Fire Network aus Wikipedia, der freien Enzyklopedie; http://de.wikipedia.org/w/index.php?title=XFN-Cross_Fire_Network&oldid=21303855; one page, dated Jun. 24, 2009.

EP Communication from related Application No. 07117923.8, dated Oct. 9, 2009.

International Search Report and Written Opinoin, PCT/EP2008/063197, dated Jul. 15, 2009.

* cited by examiner

Fig. 7

| Target Device ID | Sender Device ID | Sender Parameter ID | | |
|---|---|---|---|---|
| Sender Parameter ID (continued) | User Level | Secure PIN | | |
| Message Type | Sequence ID | | | |
| Command Executive | Command Qualifier | Section Block 8 bits | Section Type 8 bits | |
| | Channel number 24 bits | | Parameter Block 8 bits | |
| | Parameter Block Index 24 bits | | Parameter Type 16 bits | |
| Parameter Type (continued) | Parameter Index 16 bits | | Value Format 8 bits | |
| Value Field | | | | |

Fig. 8

| Target Device ID | Sender Device ID | Sender Parameter ID | |
|---|---|---|---|
| Sender Parameter ID (continued) | User Level | Secure PIN | |
| Message Type | Sequence ID | | |
| Command Executive | Command Qualifier | SCT_BLK_INPUT ID - 0x01 | SCT_TYPE_AUDIO ID - 0xD1 |
| | Channel number ID - 0x100001 | | PRM_BLK_DIGITAL _AMP ID - 0x11 |
| | Numberentry ID - 0x00001 | | GAIN ID - 0x201 |
| GAIN (continued) | Numberentry ID - 0x0000 | | 8 bit integer ID - 0x00 |

APPARATUS AND A METHOD FOR MODIFYING A COMMAND MESSAGE IN A DIGITAL MULTIMEDIA NETWORK

CROSS-REFERENCE TO RELATED APPLICATION

The present application is a 35 U.S.C. §371 National Stage Application of, and claims priority of, International patent application Serial No. PCT/EP2008/063197 filed Oct. 2, 2008 now Publication No. WO 2009/043897, published Apr. 9, 2009, published in English, the content of which is hereby incorporated by reference in its entirety.

TECHNICAL BACKGROUND

The invention relates to an apparatus and a method for modifying a command message within a digital multimedia network comprising audio and video apparatuses.

In contrast to most other industries digital networks have not gained much footage in the audio/video industry until today. The reason therefore is neither the lack of available technologies nor the demand for a digital solution. The problem lies more in the basic understanding how a substantial benefit for the user migrating from analogue to digital can be achieved. Due to the lack of a common standard, users who are using or even just experimenting with digital solutions have to either specialise their gear to fit it to custom solutions or reduce their expectations to the digital multimedia system so far that the system is not more than an audio data transport medium. With regard to digital multimedia networks there is a lack of integration of connection management with control and monitoring of parameters. Conventional networks require that a controller discovers all capabilities of target apparatus in the network before communication. Furthermore, conventional digital networks do not allow a flexible handling of parameters.

Accordingly, it is an object of the present invention to provide a user friendly digital multimedia network which provides a user friendly and flexible handling of the device parameters.

SUMMARY OF THE INVENTION

The invention provides an apparatus for modifying a command message received from a source apparatus to control a target device parameter of a target apparatus within a digital multimedia network,
  wherein a hierarchical parameter address or a parameter value contained in that command message is changed according to at least one change script to provide a modified command message; wherein said change script is provided to change a parameter value of said command message.

In an embodiment of the apparatus according to the present invention the hierarchical parameter address consists of parameter grouping identifiers each corresponding to a hierarchy level of a predetermined tree-structured parameter hierarchy used for addressing device parameters throughout said digital multimedia network.

In an embodiment of the apparatus according to the present invention the apparatus comprises a group of modifier parameters.

In an embodiment of the apparatus according to the present invention the group of modifier parameters comprises
  at least one input value parameter,
  at least one output value parameter,
  at least one value script variable parameter and
  a level script variable parameter for each hierarchy level of the tree-structured parameter hierarchy.

In an embodiment of the apparatus according to the present invention a value change script is provided to change a parameter value of the received command message sent by the source apparatus to the input value parameter of said modifying apparatus.

In an embodiment of the apparatus according to the present invention the received parameter value is processed according to the value change script to calculate a modified parameter value used to update the parameter value of the output value parameter of the modifying apparatus.

In an embodiment of the apparatus according to the present invention the value change script is stored in a memory of the apparatus.

In an embodiment of the apparatus according to the present invention for each level script variable parameter a corresponding level script is provided.

In an embodiment of the apparatus according to the present invention the hierarchical parameter address is processed according to the level scripts to generate a modified hierarchical parameter address of the modified command message to address at least one other target parameter.

In an embodiment of the apparatus according to the present invention the input value parameter is joined in an input parameter group of device parameters of at least one source apparatus.

In an embodiment of the apparatus according to the present invention the output value parameter is joined in an output parameter group of device parameters of at least one target apparatus.

In an embodiment of the apparatus according to the present invention for each parameter group a parameter group list is provided.

In an embodiment of the apparatus according to the present invention a black list flag is provided for each device parameter of said parameter group.

In an embodiment of the apparatus according to the present invention the blacklist flag is set to suppress a feedback loop in the digital multimedia network.

In an embodiment of the apparatus according to the present invention the apparatus comprises at least one control device having a processor for processing an XFN stack.

In an embodiment of the apparatus according to the present invention the change scripts are configurable.

The invention further provides a method for modifying a command message provided for controlling a target device parameter of a target apparatus within a digital multimedia network,
  wherein a hierarchical parameter address or a parameter value contained in the command message is changed in response to at least one change script to provide a modified command message, wherein said change script is provided to change a parameter value of said command message.

The invention further provides a computer programme comprising instructions for performing a method for modifying a command message provided for controlling a target device parameter of a target apparatus within a digital multimedia network,
  wherein a hierarchical parameter address or a parameter value contained in the command message is changed in response to at least one change script to provide a modified command message, wherein said change script is provided to change a parameter value of said command message.

The invention further provides a data carrier for storing such a computer programme.

BRIEF DESCRIPTION OF FIGURES

In the following embodiments of the apparatus and method for modifying a command message are described with reference to the enclosed figures.

FIG. 7 shows a further diagram for illustrating the date structure of a command message as employed by the digital multimedia network shown in FIG. 1;

FIG. 8 shows an example for a command message as employed by the digital multimedia network shown in FIG. 1;

DETAILED DESCRIPTION OF EMBODIMENTS

Figure 1:
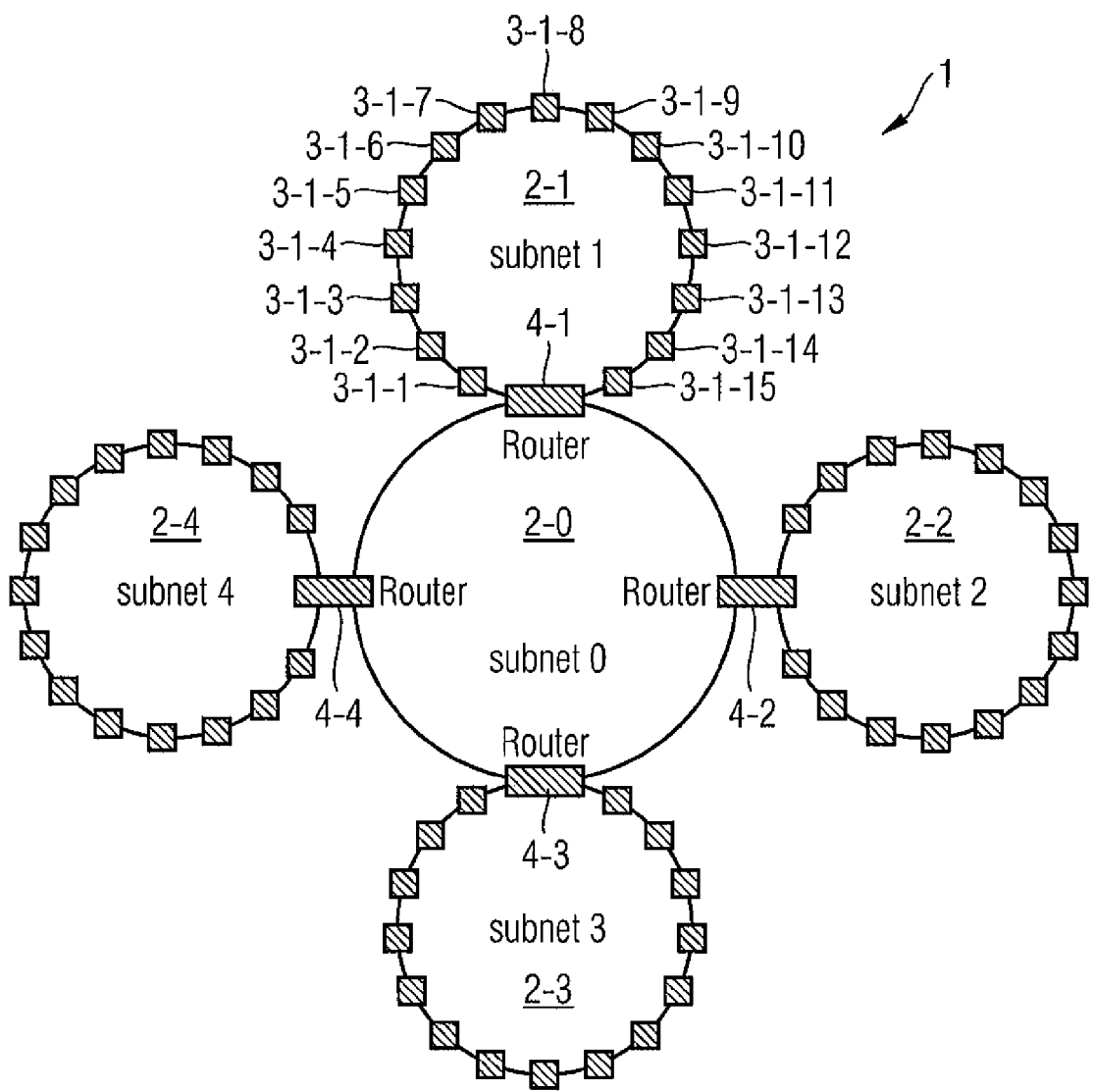
FIG. 1 shows a topology of a possible embodiment of a digital multimedia network comprising an apparatus for modifying a command message according to the present invention.
Figure 2:
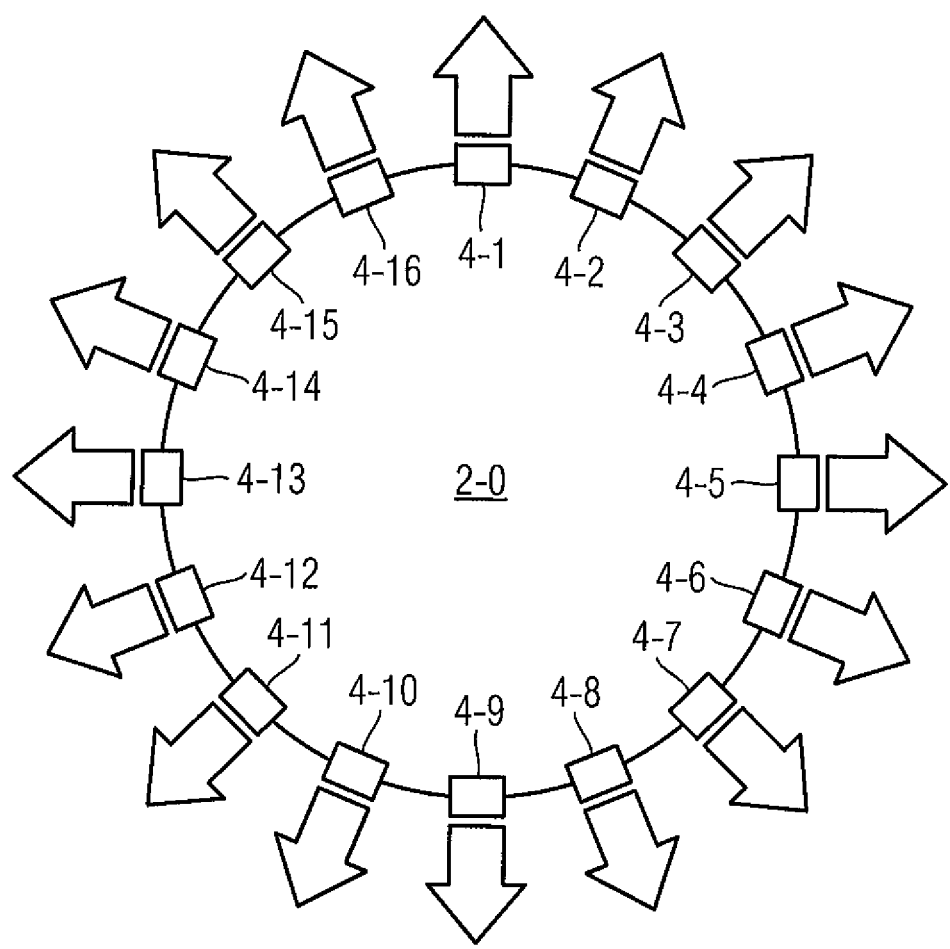
FIG. 2 shows a backbone ring of routers as employed by the digital multimedia network as shown in FIG. 1.

As can be seen from FIG. 1 a digital multimedia network 1 which comprises a plurality of video and audio apparatuses can be organised in subnets that form together the actual digital multimedia network 1. There is no limitation to the number of subnets 2-*i* within the digital multimedia network 1 of the present invention. In a possible embodiment the digital multimedia network 1 comprises a ring connection topology. In bigger systems a bigger ring of e.g. 16 routers 4 or backbone 2-0 connects all other subnets 2-*i* to the digital multimedia network 1. To each router 4 multimedia apparatuses 5 can be connected. Each of these apparatuses 5 can comprise a control device 3. This control device 3 can be integrated in the respective multimedia apparatus 5 such as a mixing console or connected to the respective multimedia apparatus 5 via an interface.

Figure 3:
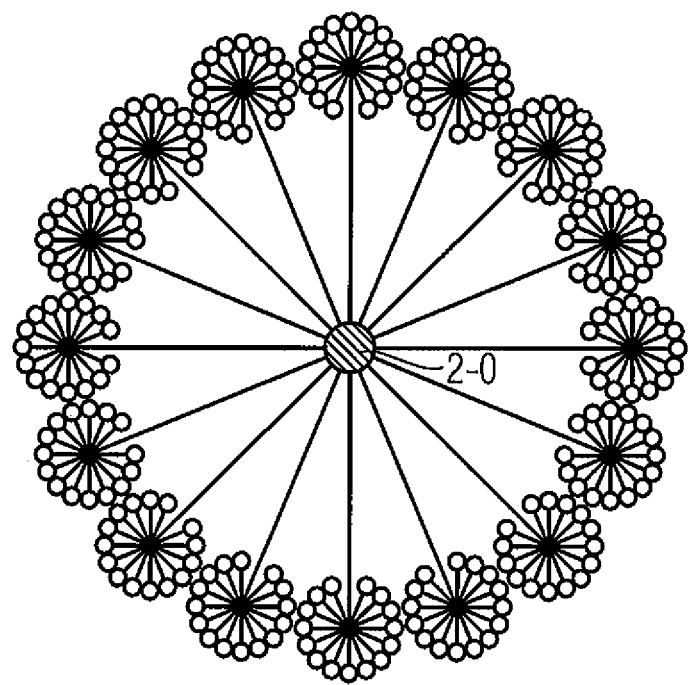
FIG. 3 shows a further example of a topology of a digital multimedia network according to the present invention comprising a cascaded ring structure.

In the embodiment shown in FIG. 3, the digital multimedia network 1 uses cascaded backbones. The center backbone 2-0 in the middle hosts e.g. 16 routers 4 which are individually connected to a corresponding number of satellite routers. These satellite routers are each connected with a bus that hosts e.g. 15 control devices 3 configured within or connected to a digital multimedia apparatus 5 such as an audio or video apparatus.

Figure 4:
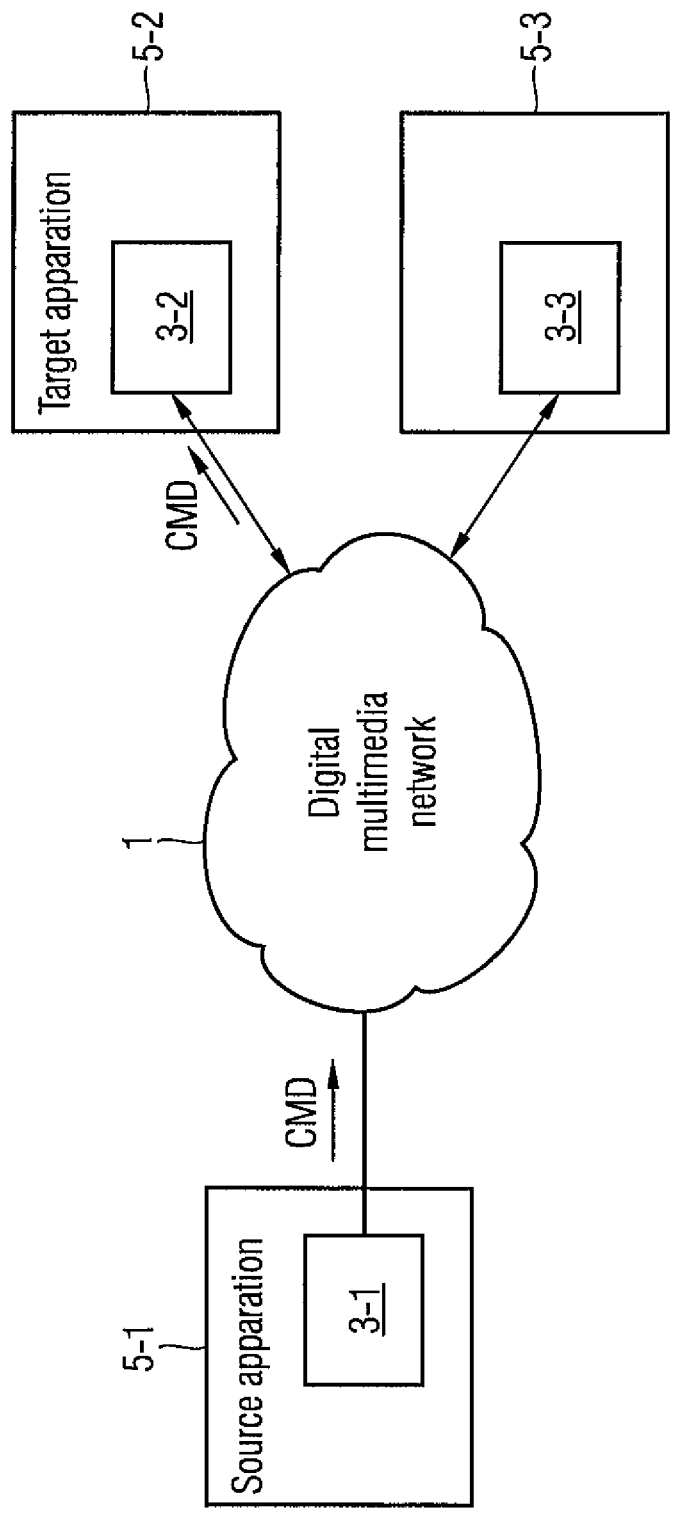
FIG. 4 shows a diagram for illustrating the transmission of a command message between a source apparatus and a target apparatus within the digital multimedia network according to the present invention.

Each control device 3 of the digital multimedia network 1, according to the present invention as shown in FIG. 4 comprises an IP stack and is addressable via its IP address. Above the IP stack each device 3 incorporates a protocol layer which contains a tree-structured parameter address hierarchy. This parameter address hierarchy reflects the structure of the respective apparatus 5 in which the control device 3 is integrated or to which it is connected. As shown in FIG. 4 a sending control device 3-1 in a source apparatus 5-1 can send a command message CMD to a receiving device 3-2 in a target apparatus 5-2.

For example a control device 3 can be integrated in a mixing console 5 which has an input section that comprises a number of channel strips each with a number of parameter groupings which in turn contain a number of device parameters. Preferably, these parameter groupings are natural to audio engineers and are reflected in the groupings within the device's hierarchy. The bottommost level nodes (leaves of the tree) represent actual parameter values and their data formats. For any device or apparatus parameter there is a fixed number of groupings from the parameter level up to the topmost tree-grouping level. Different level descriptions can be used for different industries such as audio, video or avionics. The address of a particular device parameter controlled by a control device 3 is constituted from a list of several grouping Ids, for example 7 parameter grouping IDs or level IDs. These group IDs and their associated IDs can be published. For example a manufacturer can follow a specification guideline regarding the structuring of device parameters controlled by the control device 3 of a multimedia apparatus 5. Because of the levelled structure of the messaging, "wildcard" IDs can be used as level Ids, thereby indicating a selection of all nodes or control devices at the next level of the tree. This wildcard ID allows for the control of a large number of device parameters with a single command message CMD, which can be broadcast to all control devices 3 of the digital multimedia network 1.

As can be seen from FIG. 4 a receiving control device 3-2 of a target apparatus 5-2 receives a commands for example from a controller or from a sending control device 3-1 of a source apparatus 5-1. It is possible to trace through the hierarchical tree-structure of a control device 3 by using level commands. These level commands return for each node of the tree the sub-nodes below the node. Through application of these level commands it is possible to discover device parameters of remote devices and to control them.

A control device 3 can hold an integer parameter identifier value for each device parameter that it contains or controls. Upon request from a controller which can comprise an XFN control device 3 via "a get identifier" command a control device 3 of a target apparatus 5 provides this identifier value to the controller. This allows the controller or the controlling apparatus in the future to address the device parameter with the parameter identifier value rather than with a structured hierarchical parameter address by means of an identifier command message. Command messages CMD are transmitted in a possible embodiment in an IP data package having at least one command message CMD as payload data.

The digital multimedia network 1 comprising a modifying apparatus according to the present invention employs a hierarchical control protocol. This hierarchical control protocol has a number of advantages that sets it apart from current control protocols. Every device parameter of any apparatus 5 within the network 1 is described by an hierarchical series of, for example, seven attributes where the higher level attributes indicate high level groupings within a control device. This arrangement of attributes means that a single command message broadcast across the digital multimedia network 1 has the capability of controlling an enormous number of device parameters within plurality of target apparatus 5. A multi-level control protocol as employed by the digital multimedia network 1 according to the present invention further allows for unicast control over a particular device parameter of a target apparatus 5. A further consequence of the hierarchical nature of the control protocol as employed by the digital multimedia network 1 according to the present invention is the determination of device parameters on a need-to-know basis. Thus on any level, enhanced device grouping of all the subgroups at the next lower level can be easily determined via a single command message CMD. This allows an application to provide the user with a simple parameter search capability, which does not require reading the entire parameter set from a control device 3. The digital multimedia network 1 according to the present invention employs a control protocol whose fixed hierarchical message structure models the groupings of device parameters found in professional entertainment devices or apparatuses 5 thereby allowing for a comprehensive control over the network 1 of control devices 3 within the entertainment apparatuses 5.

The XFN (cross-fire network) protocol employed by the digital multimedia network 1 is a hierarchical command-and-control protocol. XFN is an IP-based peer-to-peer network protocol in which any multimedia apparatus 5 of the network 1 may send or receive connection management, control and monitoring command messages.

In the hierarchical command and control protocol each device parameter stored in a register or memory of a control device 3 or of a corresponding apparatus 5 can be addressed via a hierarchical structure that reflects the natural layout of the apparatus 5 to which the control device 3 is connected or in which the control device 3 is integrated. For example there might be an input section on a mixing console apparatus 5 that has a number of channel strips. Each channel strip can have a gain control, a block of equalizers and a fader control. Each equalizer block can have its own structuring. Each of these groupings is considered to consist at a separate hierarchical level. At the lowest hierarchical level of any device or apparatus structure are device parameters, i.e. parameters of the corresponding apparatus 5.

Apart from addressing a device parameter via its hierarchical position in the apparatus 5 it is also possible to address the device parameter via a unique identifier. In a possible embodiment each device parameter has a unique ID which can be obtained by addressing the device parameter and requesting it. Further command messages can replace the hierarchical parameter address HPA and simply provide the appropriate identifier to access the device parameter thereby reducing message bandwidth.

The command-and-control protocol as employed by the digital multimedia network 1 further allows device parameters to be joined into parameter groups. A device parameter can hold a list of other device parameters on the same or different apparatuses 5 to which it is joined. If a device parameter is modified by a command message CMD then the same command message is directed to all device parameters within its parameter group list PGL. For example, a fader on a mixing console typically has a device parameter that represents its position. This device parameter might be joined to fader parameters on other mixing consoles and possibly to gain parameters on breakout boxes. If the single fader is moved its parameter group list PGL is scanned and command messages CMD are sent to all joined device parameters within the parameter group.

Figure 5:
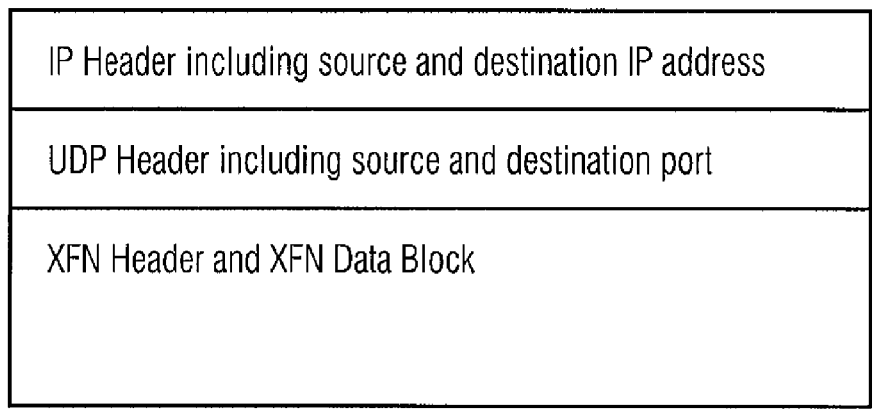
FIG. 5 shows a diagram for illustrating a possible data structure of a command message as employed by the digital multimedia network shown in FIG. 1.

The overall layout of a command message CMD is shown in FIG. 5. The command message can be contained within the data area of a UDP datagram. The UDP header and data area can in turn be contained within the date area of an IP datagram. Every IP datagram has within its header a source and a destination IP address.

Figure 6:
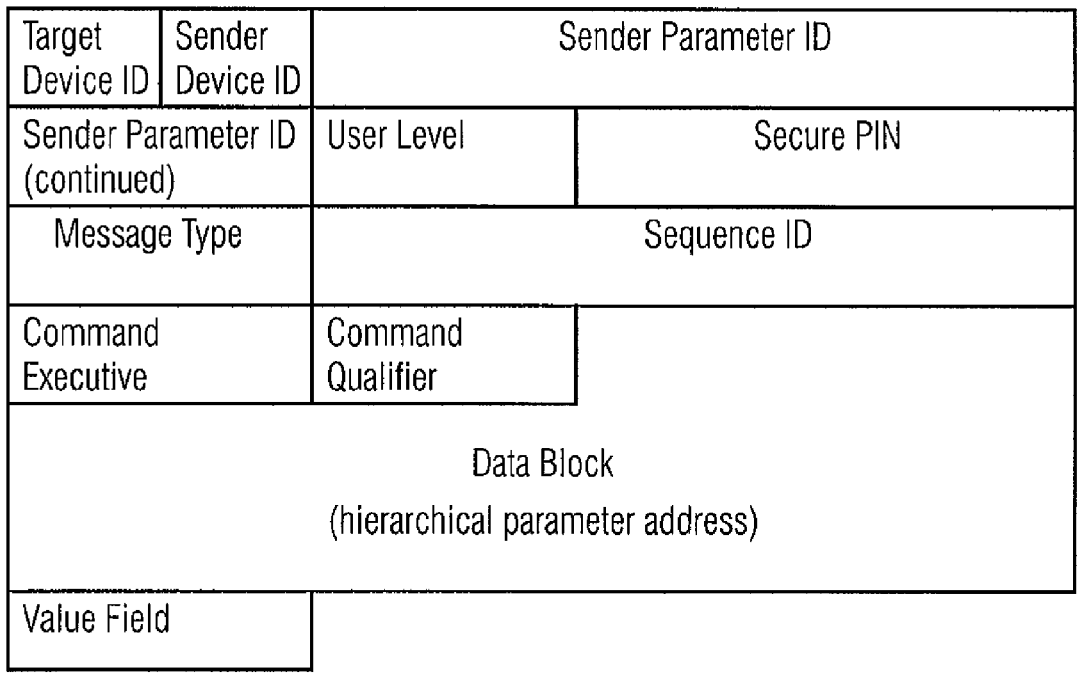
FIG. 6 shows a further diagram for illustrating the data structure of a command message as employed by the digital multimedia network shown in FIG. 1.

The primary purpose of a command-and-control message 10D is to get and set the various parameters of apparatuses 5 and in doing so control the capabilities of these apparatuses 5. A command message CMD is a data structure with a number of data fields or components. The full layout of a command message CMD is shown in FIG. 6. In setting a value of a device parameter, a data block, i.e. a hierarchical parameter address HPA is followed by a parameter value field. In an embodiment, the header of a command-and-control message CMD comprises the data fields as shown in FIG. 6. These data fields comprise a target device ID, a sender device ID as well as a sender parameter ID. In the present embodiment further data fields are a user level, a secure PIN, a message type, a sequence ID, a command executive, and command qualifier. Besides these header data, the command-and-control message CMD comprises a data block which provides the address of a target device parameter of a target apparatus 5 in a N-level hierarchical format. This hierarchical structure enables groups of device parameters to be addressed within a single command message CMD. The command message data block is used to address a target parameter in a N-level hierarchy. The structure of a data block results from the observation that any apparatus 5 of the network 1 can be viewed as a series of functional groupings and that the device parameters are positioned at the lowest level of such a series of groupings.

FIG. 7 shows a hierarchical parameter addressed block within a command and control message CMD in more detail. As can be seen from FIG. 7, the hierarchical functional groupings comprise a section block (level 1), a section type (level 2), a general number (level 3) a parameter block (level 4), a parameter block index (level 5), a parameter type (level 6) and a parameter index (level 7).

In the following these functional groupings are briefly described:

Section block (level 1) is the highest functional group. Any apparatus 5 can be considered to comprise a number of sections. For example there might be an input section, an output section, an input matrix section, an output matrix section etc. This top level grouping identifies the high level section block within which the device parameter resides.

Section type (level 2) can be viewed as a subgroup within the section block and it is used to differentiate components of the section block. For example within the input section block of a mixing console there can be various types of inputs, line inputs, tape inputs, etc.

At the next level a channel number (level 3) is provided. Most audio or video parameters are related to an audio or video channel. These device parameters can be responsible for processing a channel or routing a channel. It is important to be able to trace a channel throughout the multi-apparatus digital multimedia network 1 and by ensuring that each parameter structure includes a channel number at level 3 this capability is facilitated.

At the next level (level 4) a parameter block is provided. At this level device parameters are clustered into parameter groups. This allows for the processing and routing of audio channels. For example, there can be a block of equalisers that allow for wide ranging equalisation of an audio channel.

At the next level (level 5) a parameter block index is provided. This grouping allows for differentiation of similar components within a parameter block. For example, there can be equalisation subgroupings of device parameters related to frequency and gain.

At the next level (level 6) a parameter type functional grouping is provided. As the grouping name indicates, this level provides the type of the device parameter being accessed, examples being gain, low frequency, threshold, etc.

At the final level (level 7) a parameter index is provided. This final level provides for accurate addressing if there are for example many device parameters of the same type that process an audio video signal of the channel.

FIG. 8 shows an example of a command message CMD wherein the levels of the parameter address data block have been filled with appropriate identifiers. The device parameter in this case is a gain for a channel on a mixing console. The value of a device parameter can be changed via a set value command message that is sent from a source apparatus 5-1. The value of a device parameter can also be changed via a set group value command message if the respective device parameter forms part of a parameter group and is listed in a parameter group list PGL and the value of another device parameter within the same parameter group is modified.

There are instances where the values sent from one device parameter to another device parameter have to be modified. For example, when two faders with an inverse relationship are provided it is useful to join the two device parameters, i.e. faders and to modify the parameter values and the command message between the two device parameters such that the parameter values are inverted. There are also instances where the address data block obtained with a command message pushed from a device parameter needs to be modified. For example, when a small control apparatus with a limited number of faders is required to control the gains of a large multichannel mixing console it is useful to be able to quickly modify the channel numbers of the data blocks that are pushed out by the faders. This allows the faders to control gains on any of the channels of the mixing console.

Figure 9:
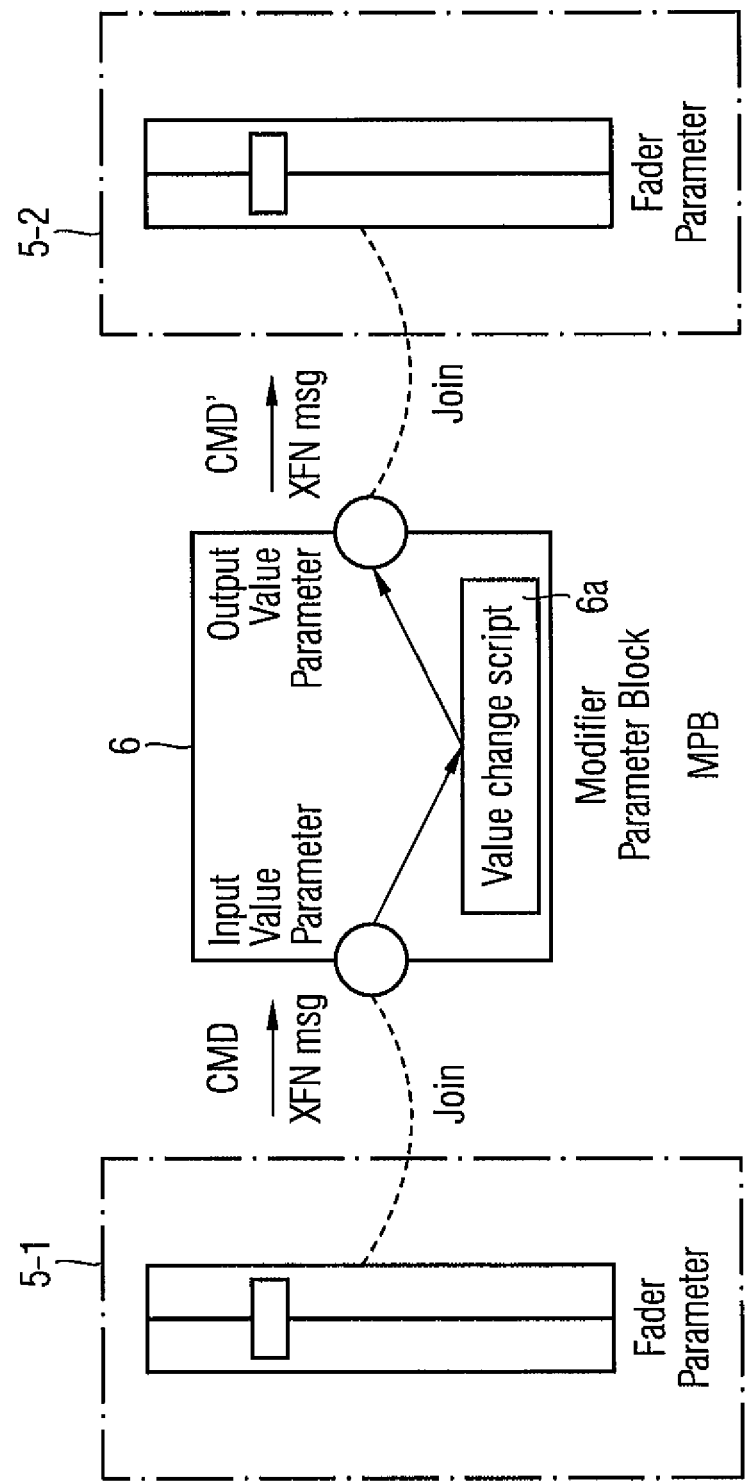
FIG. 9 shows a diagram for illustrating an apparatus for modifying a command message according to the present invention.

To provide the ability to modify command messages CMD in a digital multimedia network 1 employing a hierarchical parameter control protocol the present invention provides an apparatus 6 for modifying command messages as shown in FIG. 9. The apparatus 6 shown in FIG. 9 is provided for modifying a command message CMD received from a source apparatus 5-1 to control a target device parameter of a target apparatus 5-2 within the digital multimedia network 1. The apparatus 6 forms a modifier parameter block which can be integrated in an apparatus 5 of its own. For example as shown in FIG. 9 the fader parameter of a source apparatus 5-1 controls a fader parameter in a target apparatus 5-2. The XFN control device within the source apparatus 5-1 sends the control message to control the device parameter in target apparatus 5-2. In the given example the two faders have an inverse relationship. The parameter value obtained in the generated command message CMD is changed by the modifier parameter block 6 according to a change script to provide a modified command message CMD'. In an embodiment a value change script is stored in a memory 6a of the modifying apparatus 6.

In a possible embodiment the apparatus 6 comprises a group of modifier parameters. These modifier parameters can comprise at least one input value parameter IVP, at least one output value parameter OVP and at least one value script variable parameter VVP. Further level script variable parameters LVP for each hierarchy level of the tree-structured parameter hierarchy can be provided.

The value change script stored in the memory 6a is provided to change the parameter value of the command message CMD received from the source apparatus 5-1. A command message is sent to the input value parameter IVP of the modifying apparatus 6. The received parameter value is processed according to the stored value change script to calculate a modified parameter value used to update the parameter value of the output value parameter OVP of the modifying apparatus 6.

The input value parameter IVP can be joined by a join mechanism in an input parameter group of device parameters of at least one source apparatus. In the same manner the output value parameter OVP can be joined in an output parameter group of device parameters of at least one target apparatus of the network 1. In an embodiment the modifying apparatus 6 comprises a parameter group list PGL for each parameter group, in particular for the input parameter group and the output parameter group. As can be seen in FIG. 9 a fader parameter of the source apparatus 5-1 is joined to the input value parameter IVP of the modifier parameter apparatus 6. If the fader parameter is adjusted a set group value message can be sent to the input value parameter IVP. The input value parameter IVP receives the command message CMD and causes the value change script to process the parameter value to create a modified parameter value. This modified parameter value updates the value of the output value parameter OVP. The output value parameter is joined to a fader parameter of the target apparatus 5-2. As the parameter value of the output value parameter OVP changes it sends a command message to the fader parameter with the parameter value modified according to the corresponding value change script.

The value change script can for example indicate an inverse relationship between the two faders. In this case the value change script can be of the form:

$$\text{Value OPV} = \max \text{ value} - \text{value IPV}.$$

In a possible embodiment the modifying apparatus 6 according to the present invention does not only modify a parameter value but also one or several parameter grouping identifiers corresponding to a hierarchical level of the predetermined tree-structured parameter hierarchy used for addressing device parameters throughout the digital multimedia network 1.

Figure 10:
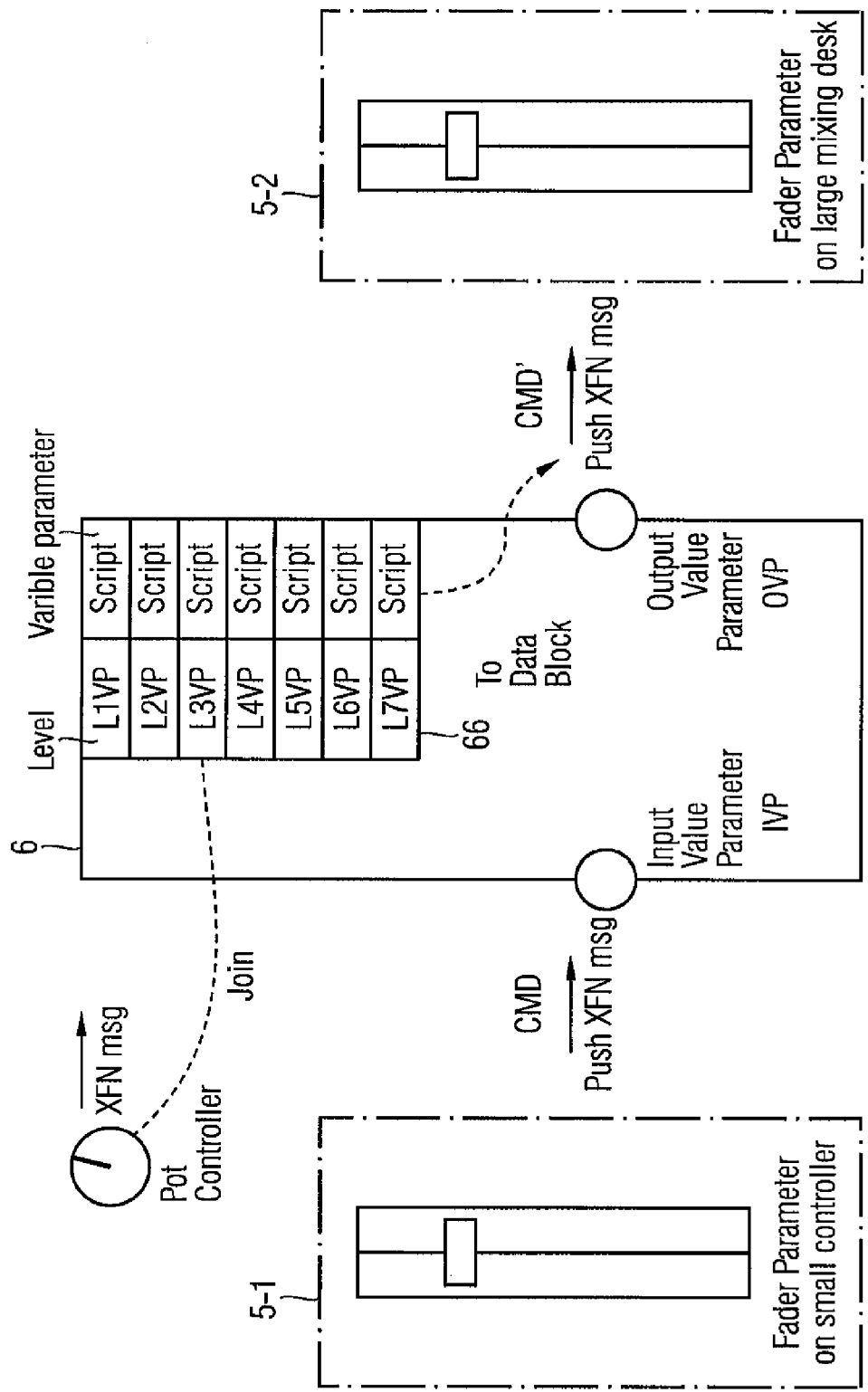
FIG. 10 shows a further diagram for illustrating a preferred embodiment of an apparatus for modifying a command message according to the present invention.

In a possible embodiment a level script variable parameter LVP is provided for each hierarchy level of the tree-structural parameter hierarchy and a corresponding script is stored in a memory 6b of the apparatus 6 as shown in FIG. 10. For each level script variable parameter a corresponding level change script is provided and stored in the memory 6b. The hierarchical parameter address of the received command message CMD is processed according to the respective level change scripts to generate a modified hierarchical parameter address of the modified command message CMD' to address another target device parameter. For example as shown in FIG. 10 a fader parameter of a source apparatus 5-1 such as a small controller is put into a push state and the device parameter to be pushed is specified as the input value parameter IVP of the modifying apparatus 6. In a similar fashion the output value parameter OVP is set to a push state and the device parameter to be pushed is specified as the fader parameter of a target apparatus 5-2. In the memory 6b of the modifying apparatus 6 a series of level variable parameters and associated scripts are stored. Each script indicates a processing rule for processing the grouping identifier at that level. This processing modifies the nature of the data block, i.e. the hierarchical parameter address, that is incorporated into the command message for the device parameter pushed from the output value parameter OVP and hence indicates another device parameter to be targeted.

Each level script may incorporate a variable. For example a level 3 (channel number) script might indicate:

level 3 ID=level 3 ID+L3VP

In this example the L3VP variable is added to the current ID value and a modification causes a mixing desk fader parameter on a different channel to be addressed and its value changed.

In a possible embodiment controllers are provided which exert control over the values of various variables. In the example of FIG. 10 a pot controller parameter has been joined to the L3VP variable device parameter. When the pot controller is adjusted the value of the L3VP parameter is changed and the script evaluates the changed value.

In a preferred embodiment the modifier apparatus 6 according to the present invention is able to suppress a feedback loop in the digital multimedia network 1. In some modifier configurations it is necessary to prevent such a feedback of the output from one modifier to its input. A typical example is a configuration that uses modifiers to allow a cross fade between two groups of faders as shown in FIG. 11.

Figure 11:
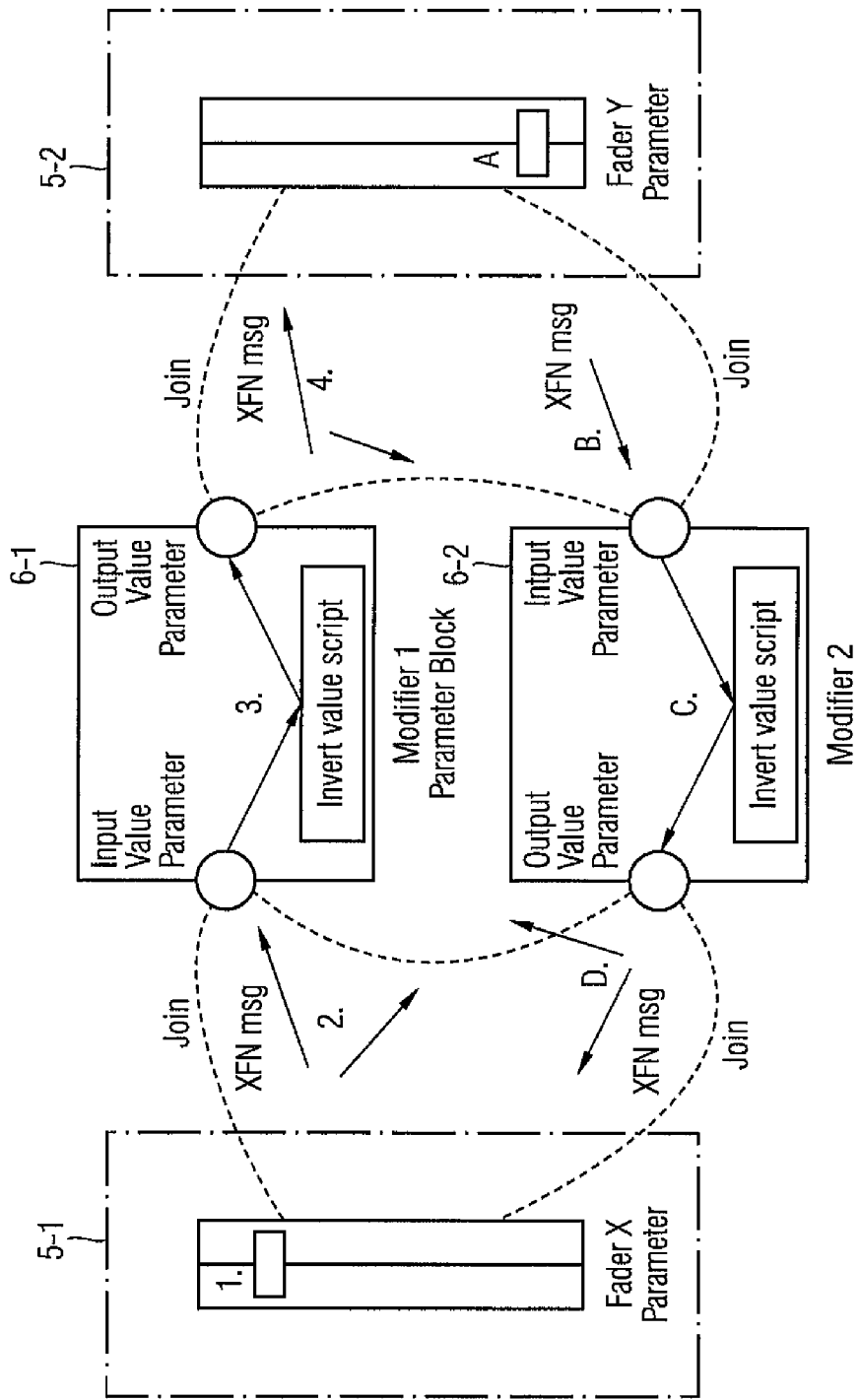
FIG. 11 shows a diagram for illustrating a feedback control as provided by an apparatus for modifying a command message according to the present invention.

In the configuration shown in FIG. 11 an inverse relationship is established between a fader X in a source apparatus 5-1 and a fader Y in a target apparatus 5-2. Further two peer-to-peer parameter groups are provided.

The first parameter group comprises the following parameters: fader X of the source apparatus 5-1, the input value parameter IVP of the first modifying apparatus 6-1, and the output variable parameter OVP of the second modifying apparatus 6-2.

The second peer-to-peer parameter group comprises fader Y parameter of the target apparatus 5-2, input value parameter IVP of the second modifying apparatus 6-2 and the output value parameter OVP of the first modifying apparatus 6-1.

When fader X in the source apparatus 5-1 is adjusted the following sequence of events occurs: first an XFN "set group value" command message is sent to all members of the peer-to-peer parameter group that the fader X is part of, i.e. to the first peer-to-peer parameter group.

The output value parameter OVP of the second modifying apparatus 6-2 does not respond to the set group command message since it is a modifier output value parameter. The input value parameter IVP of the first modifying apparatus 6-1 responds and triggers a value change script stored in the memory of the first modifying apparatus 6-1. In the given example the value change script is an invert value script that inverts the parameter value contained in the command message CMD received by the first modifying apparatus 6-1 from the source apparatus 5-1. The invert value script inverts the parameter value and sets the output value parameter OVP of the first modifying apparatus 6-1 to this calculated parameter value.

The output value parameter OVP of the first modifying apparatus 6-1 then sends a set group value command message to the fader Y device parameter in the target apparatus 5-2. The fader Y in the target apparatus 5-2 is set to the inverted parameter value of fader X. The output value parameter OVP of the first modifying apparatus 6-1 also sends a set group value command message to the input value parameter IVP of the second modifying apparatus 6-2. If the input value parameter of the second modifier 2 responds to the set group value command message from the input value parameter IVP of the first modifying apparatus 6-1 this initiates a feedback loop wherein the feedback loop comprises: modifier 1 IVP→modifier 2 OVP→modifier 1 IVP→modifier 2 OVP→modifier 2-IVP.

To prevent such a feedback loop the modifying apparatus 6 according to the present invention comprises in a preferred embodiment a blacklisting mechanism. With this mechanism a device parameter can blacklist one of the member parameters of its peer-to-peer parameter group. It does not respond to command messages from such a blacklisted parameter. In a possible embodiment blacklisting of device parameters is performed by means of a blacklist flag associated with the device parameter of the respective parameter group. In an embodiment a blacklist flag is provided and can be set for each device parameter of the respective parameter group. This blacklist flag is set to suppress a feedback loop in the digital multimedia network 1.

In the example shown in FIG. 11 the input value parameter IVP of the second modifying apparatus 6-2 has the output value parameter OVP of the second modifier 6-2 as one of its device parameters on its peer-to-peer parameter group list and this device parameter is blacklisted to suppress the feedback loop.

A similar scenario to generate an unwanted feedback loop can occur with fader Y when apparatus 5-2 is adjusted. In this case an XFN set group value command message is sent to all members of the peer-to-peer group that fader Y is part of. The output value parameter OVP of the first modifier 6-1 does not respond to this set group value command message since it is a modifier output value parameter. The input value parameter IVP of the second modifier 6-2 does respond and triggers the change value script of the second modifier 6-2. In this example the value change script inverts the parameter value and sets the output value parameter OVP of the second modifying apparatus 6-2 to this changed value. Then the output value parameter OVP of the second modifying apparatus 6-2 sends a set group value command message to the fader X parameter in the apparatus 5-1. This fader X parameter then takes on the inverted value of fader Y. The output value parameter OVP of the second modifying apparatus 6-2 does also send a set group value command message to the input value parameter IVP of the first modifying apparatus 6-1 thus forming another feedback loop. To prevent or suppress this feedback loop the input value parameter IVP of the second modifying apparatus 6-2 blacklists the output value parameter OVP of the first modifying apparatus 6-1.

Fader X can be part of a peer-to-peer parameter group of faders and fader Y can be part of a different parameter group of peer-to-peer faders. In a possible example an inverse relationship between the two fader groups is desired to allow for a cross fade between the inputs of parameter group of fader X and the inputs of the parameter group of fader Y. In a possible embodiment it is possible for any fader within the parameter group of fader X to be adjusted for all faders within the parameter group to move relative to each other and to cause all faders in the parameter group of fader Y to move according to an inverse relationship. In a possible embodiment the change scripts stored in the memories 6a, 6b of the modifying apparatus 6 are configurable. In a possible embodiment the configuration is performed via an interface of the modifying apparatus 6. In a possible embodiment a remote configuration of the change scripts can be performed by means of command messages sent from a source apparatus to the modifying apparatus 6. In a possible embodiment a feedback loop is detected automatically and indicated.

The invention claimed is:

1. An apparatus for modifying a command message, said apparatus comprising:

at least one control device comprising a processor and a memory, wherein said processor processes an XFN (cross-fire network) stack and communicates with said memory, wherein said apparatus receives said command message from a source device, wherein said command message is used to control a target device parameter of a target device within a digital multimedia network, wherein said digital multimedia network employs a control protocol, said control protocol having a fixed hierarchical message structure, wherein said control protocol comprises a hierarchical command-and-control protocol, comprising an XFN protocol, wherein said fixed hierarchical message models a groupings of a plurality of device parameters found in a plurality of entertainment apparatuses, wherein said XFN protocol is an IP-based peer-to-peer network protocol which enables apparatuses within a network to send and/or receive connection management, control and monitoring command messages, wherein a hierarchical parameter address contained in said command message is changed according to at least one change script to provide a modified command message, wherein said hierarchical parameter address comprising:

parameter grouping identifiers each corresponding to a hierarchy level of a predetermined tree-structured parameter hierarchy used for addressing device parameters throughout said digital multimedia network, wherein said change script is stored in the memory of said control device, and wherein said change according to at least one change script comprising:

receiving said hierarchical parameter address in said command message which is processed according to said change script to calculate a modified hierarchical parameter address used to update a second hierarchical parameter address of a output value parameter of said modified command message which is to be sent to said target device, wherein said apparatus transmits said modified hierarchical parameter address within said modified command message to said target device.

2. The apparatus according to claim 1, wherein said apparatus comprises a group of modifier parameters.

3. The apparatus according to claim 2, wherein said group of modifier parameters comprises:

at least one input value parameter (IVP),
at least one output value parameter (OVP),
at least one value script variable parameter (VVP), and
a level script variable parameter (LVP) for each hierarchy level of said tree-structured parameter hierarchy.

4. The apparatus according to claim 3, wherein for each level script variable parameter (LVP) a corresponding level script is provided.

5. The apparatus according to claim 4, wherein the hierarchical parameter address (HPA) is processed according to said level scripts to generate a modified hierarchical parameter address (HPA) of the modified command message to address another target parameter.

6. The apparatus according to claim 3, wherein said input value parameter (IVP) is joined in an input parameter group of device parameters of at least one source apparatus.

7. The apparatus according to claim 3, wherein said output value parameter (OVP) is joined in an output parameter group of device parameters of at least one target apparatus.

8. The apparatus according to claim 7, wherein for each parameter group a parameter group list (PGL) is provided.

9. The apparatus according to claim 8, wherein a blacklist flag is provided for each parameter of said parameter group.

10. The apparatus according to claim 9, wherein the blacklist flag is set to suppress a feedback loop in said digital multimedia network.

11. The apparatus according to claim 1, wherein a value change script is provided to change said parameter value of the received command message sent by said source apparatus to said input value parameter (IVP) of said modifying apparatus.

12. The apparatus according to claim 11, wherein said received parameter value is processed according to said value change script to calculate a modified parameter value used to update the parameter value of said output value parameter (OVP) of said modifying apparatus.

13. The apparatus according to claim 1, wherein said change scripts are configurable.

14. A method for modifying a command message, said method comprising, processing, by a control device of an apparatus, an XFN (cross-fire network) stack, receiving, by an apparatus, said command message from a source device, wherein said command message is used to control a target device parameter of a target device within a digital multimedia network, employing, by the digital multimedia network, a control protocol, said control protocol having a fixed hierarchical message structure, wherein said control protocol comprises a hierarchical command-and-control protocol, comprising an XFN protocol, wherein said fixed hierarchical message modeling a groupings of device parameters found in entertainment apparatuses, wherein said XFN protocol is an IP-based peer-to-peer network protocol which enables sending and/or receiving connection management, control and monitoring command messages within a network, changing a hierarchical parameter address contained in said command message in response to at least one change script to provide a modified command message, wherein said hierarchical parameter address comprises:

parameter grouping identifiers each corresponding to a hierarchy level of a
predetermined tree-structured parameter hierarchy used for addressing device parameters throughout said digital multimedia network, storing said change script in a memory of the control device, and wherein said changing in response to at least one change script comprises:

receiving said hierarchical parameter address in said command message which is processed according to said change script to calculate a modified hierarchical parameter address used to update a second hierarchical parameter address of a output value parameter of said modified command message which is to be sent to said target device, transmitting said modified hierarchical parameter address within said modified command message to said target device.

* * * * *